May 17, 1932.    A. S. WHEELBARGER ET AL    1,858,813
TICKET PRINTING, ISSUING, AND RECORDING MACHINE
Filed Oct. 29, 1925    5 Sheets-Sheet 1

Inventors
Albert S. Wheelbarger
Grover C. Coil

By Hastings W. Baker

Attorney

May 17, 1932.  A. S. WHEELBARGER ET AL  1,858,813
TICKET PRINTING, ISSUING, AND RECORDING MACHINE
Filed Oct. 29, 1925   5 Sheets-Sheet 5

Inventors.
Albert S. Wheelbarger
Grover C. Coil
By Hastings W. Baker
Attorney

Patented May 17, 1932

1,858,813

UNITED STATES PATENT OFFICE

ALBERT S. WHEELBARGER AND GROVER C. COIL, OF DAYTON, OHIO, ASSIGNORS TO OHMER FARE REGISTER COMPANY, OF DAYTON, OHIO, A CORPORATION OF OHIO

TICKET PRINTING, ISSUING, AND RECORDING MACHINE

Application filed October 29, 1925. Serial No. 65,532.

This invention relates to an improved ticket printing, issuing and recording machine in which the ticket has impressed thereon printing characters giving all of the essential data in regard to a ticket, such as a word of explanation to the passenger, the date, the issuing station, the direction of travel, the destination, the amount paid for the transportation, and the serial number. The record has impressed thereon printing characters showing the number of the machine, the conductor's number, the date, designation of the issuing station, direction of travel, the destination, the fare paid, the class of transportation and the serial number. The ticket is issued to the passenger while the record is stored in the machine to be later turned over to the auditor.

The invention further relates to a full stroke mechanism so that the conductor must completely issue a ticket after the printing thereof has been commenced. The full stroke mechanism prevents the conductor rotating the crank handle for a portion of a rotation and then rotating it back to its original position. Furthermore, locking means are provided so that the levers which set the type wheels are locked as soon as the operating crank handle has been rotated for even a portion of a revolution. This forces the conductor to first set the type operating levers in their correct position and then to print and issue a ticket. This arrangement, furthermore, holds the type wheels against rotation either accidental or intentional during the printing operation.

The invention, furthermore, comprises novel printing mechanism whereby an impression from a single bank of printing characters may be impressed upon both the ticket and the record, so that there is no possibility of a discrepancy existing between the record and the tickets. The novel printing mechanism also provides means whereby all smearing action is completely eliminated so that the printing is clear and distinct.

Another object of the invention is to provide novel winding mechanism for the drum on which the record is wound, so that the impressions on the record will be evenly spaced apart, regardless of the thickness of the record roll.

Another object of the invention is to provide a novel consecutive counter, comprising type wheels which print the consecutive number on both the ticket and the record.

Another object of the invention is to provide a locking means for all of the type wheels when the conductor's key is removed, so that it would be impossible to operate the machine unless the conductor's key was inserted, which key carries printing type to be impressed upon the record or upon both the record and the ticket as desired.

A still further object of the invention is to provide novel setting means for the printing wheels.

Other objects and advantages of the invention will appear in the detailed description.

Referring more in detail to the drawings, the machine is inclosed in a casing 1 secured to a bottom 2 which bottom is hinged to a door 3. The machine is secured to the bottom or base 2 and when the door 3 is in the position shown in Figure 1, the casing 1 may be readily placed over the machine. The casing 1 is provided with a flange 4 which overlaps the upper end of the door 3 and holds the same in position. A door 5' is also provided in the casing, which door gives ready access to the setting means for the date printing wheels. The levers 5, which operate all of the printing wheels except the consecutive counter and the date printing wheels, extend through slots 6 in the top of the casing 1. The slots 6 are formed between panels 7 which are inserted in the top of the casing. These panels can be removed when it is desired to remove the casing. Each of the panels is provided with characters from zero to nine inclusive, with the exception of the left end panel and the fourth panel from the right. The left end panel is provided with characters showing the class of transportation, such as "Tic" for ticket, "H. F." for half fare, "Com" for commutation, "Sch" for school, "Cu" for coupon, "Mil" for mileage, "R. T." for round trip, "Ps" for passenger, and "Trn" for transfer. Of course, other characters may be employed if desired. The fourth panel from the right is provided with characters designating the direction of travel such as "I" for in, "O" for out, "D" for down, "U" for up, and "W. E. S. N." for west, east, south and north respectively.

*Full stroke mechanism*

Figure 6:
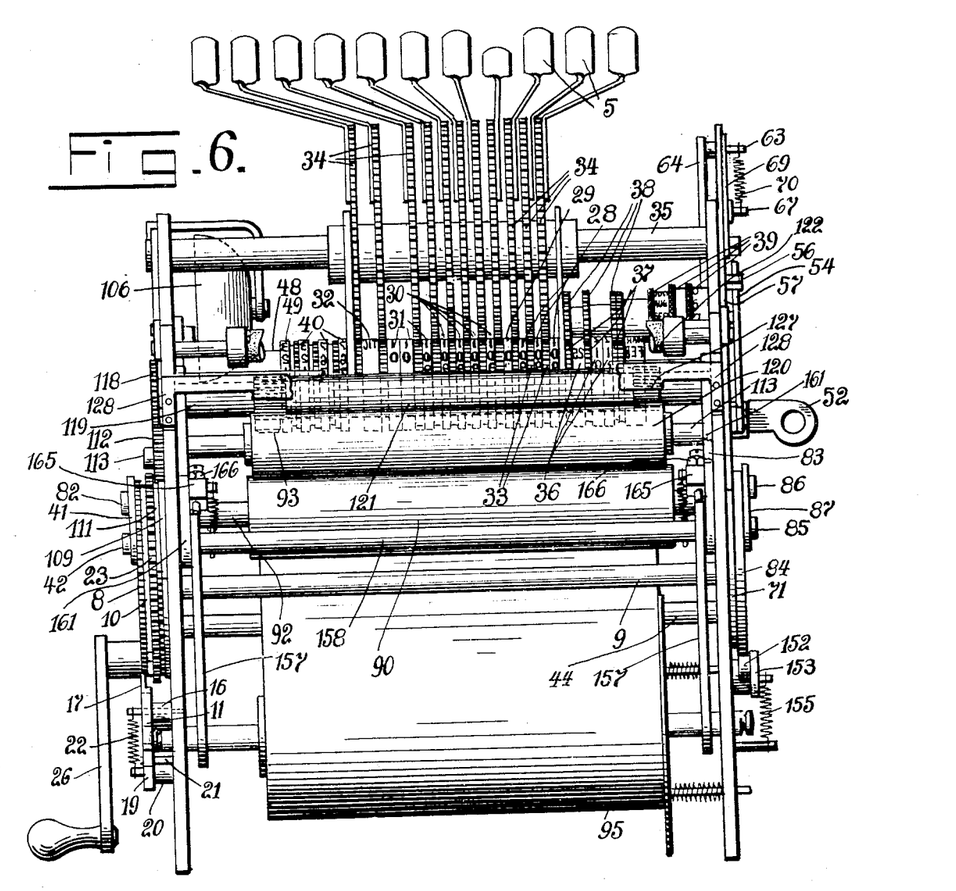
Figure 6 is a front elevational view.
Figure 6A:
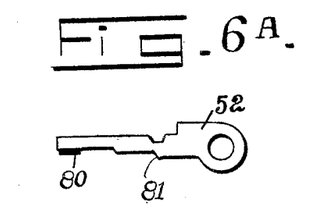
Fig. 6a shows the key.
Figure 8:
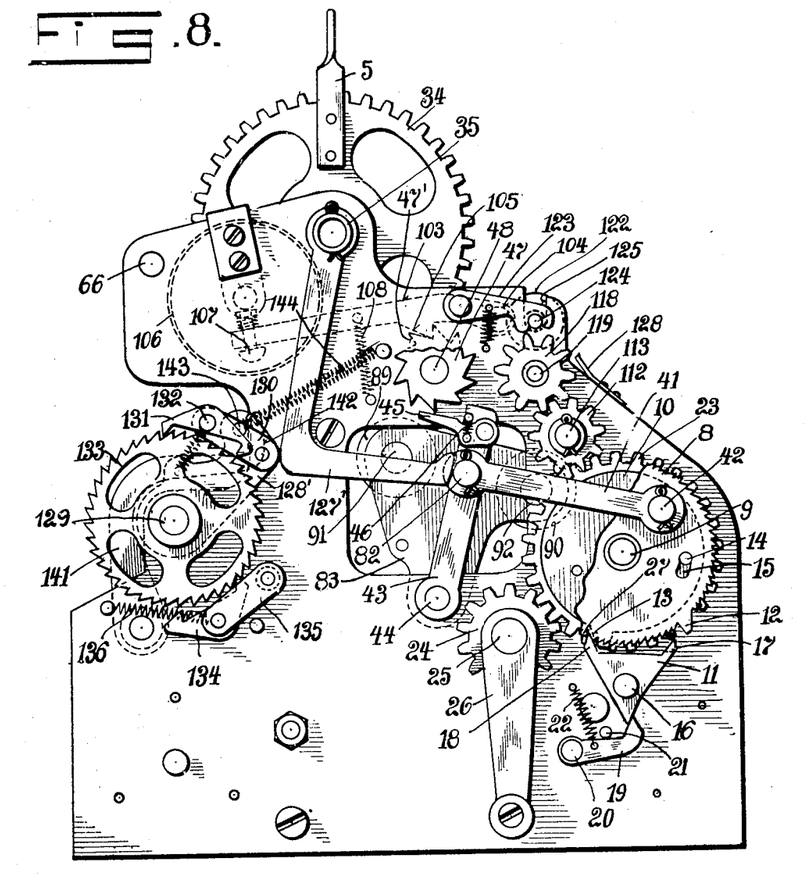
Figure 8 is an elevational view of the left side of the machine.
Figure 9:
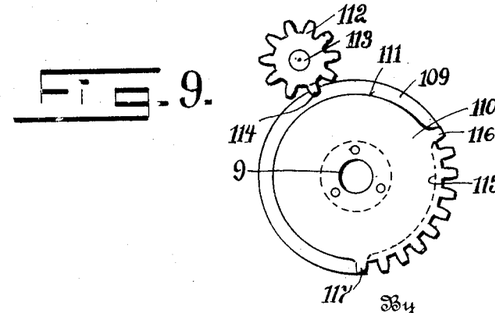
Figure 9 is a detailed view of a part of the driving means for the ticket feed rollers employed in issuing the ticket. All of the views show the machine with the casing removed with the exception of Figure 1.

The full stroke mechanism, best seen in Figures 6 and 8, consists of a ratchet 8 rigid on the shaft 9, a disk 10 and a double nosed dog 11. The ratchet 8 is provided with ratchet teeth for the major portion of its circumference, and is also provided with a large tooth 12. The disk 10 is provided with a single tooth 13. The disk 10 is rotatably mounted on the shaft 9 and is operatively connected with the ratchet 8 by means of a pin 14 on the disk 10 which pin extends through a slot 15 in the ratchet 8. The dog 11 is pivoted on a pin 16 and is provided with a nose 17 actuated by the tooth 12 and a nose 18 actuated by the tooth 13. The dog 11 is V shaped and is held in either of its two positions by means of a lever 19 pivoted on a pin 20 in one of the sidewalls of the machine. A stop pin 21 projects from the side of the casing immediately above the lever 19. The lever 19 is normally urged towards the stop pin 21 by means of a spring 22. Secured to the disk 10 is a gear 23 which gear is rotatably mounted on the shaft 9 and is in mesh with a pinion 24 secured to a shaft 25, which shaft also receives the crank handle 26. The pinion 24 is one-half the size of the gear 23 so that the crank handle 26 must be rotated twice in order to rotate the gear 23 and shaft 9, one complete revolution. After a ticket has been completely issued the dog 11 is in the position shown in Figure 8, with the nose 18 engaging a tooth 27 on the ratchet 8. The crank handle 26 is normally rotated in a clockwise direction in order to print and issue the tickets as well as to print the record, but when the parts are in the position shown in Figure 8, the crank handle 26 cannot be rotated in a clockwise direction for the gear 23 will be rotated in an anti-clockwise direction, and the nose 18 engaging the tooth 27 prevents such a rotation. The crank handle 26 must, therefore, be rotated in an anti-clockwise direction for a small distance so that the tooth 13 engages the nose 18 rocking the dog 11 in an anti-clockwise direction. The lower end of the dog 11 carries the lever 19 downwardly until the end of the lever 19 passes the lower extremity of the dog 11, whereupon the spring 22 pulls the lever 19 upwardly, holding the nose 17 of the dog 11 against the teeth of the ratchet 8. The ratchet can now be rotated in a clockwise direction by means of the pin 14 engaging the end of a slot 15. At the end of a complete rotation the tooth 12 engages a nose 17 and locks the dog 11 into the position shown in Figure 8. As the dog 11 was being thus locked, the lever 19 was depressed until the upper end thereof passed the lower extremity of the dog 11 and the spring 22 then pulls the lever 19 upwardly, holding the dog 11 in that position. The object of the pin and slot connection is to permit of the slight anti-clockwise rotation of the crank handle 26 without rotating the shaft 9. This construction prevents the conductor accidentally rotating the crank handle 26 for two movements are necessary in order to actuate the shaft 9, a slight anti-clockwise rotation of the crank handle 26 and then two complete revolutions thereof.

*Setting means for the type wheels*

Figures 1, 2, 3:
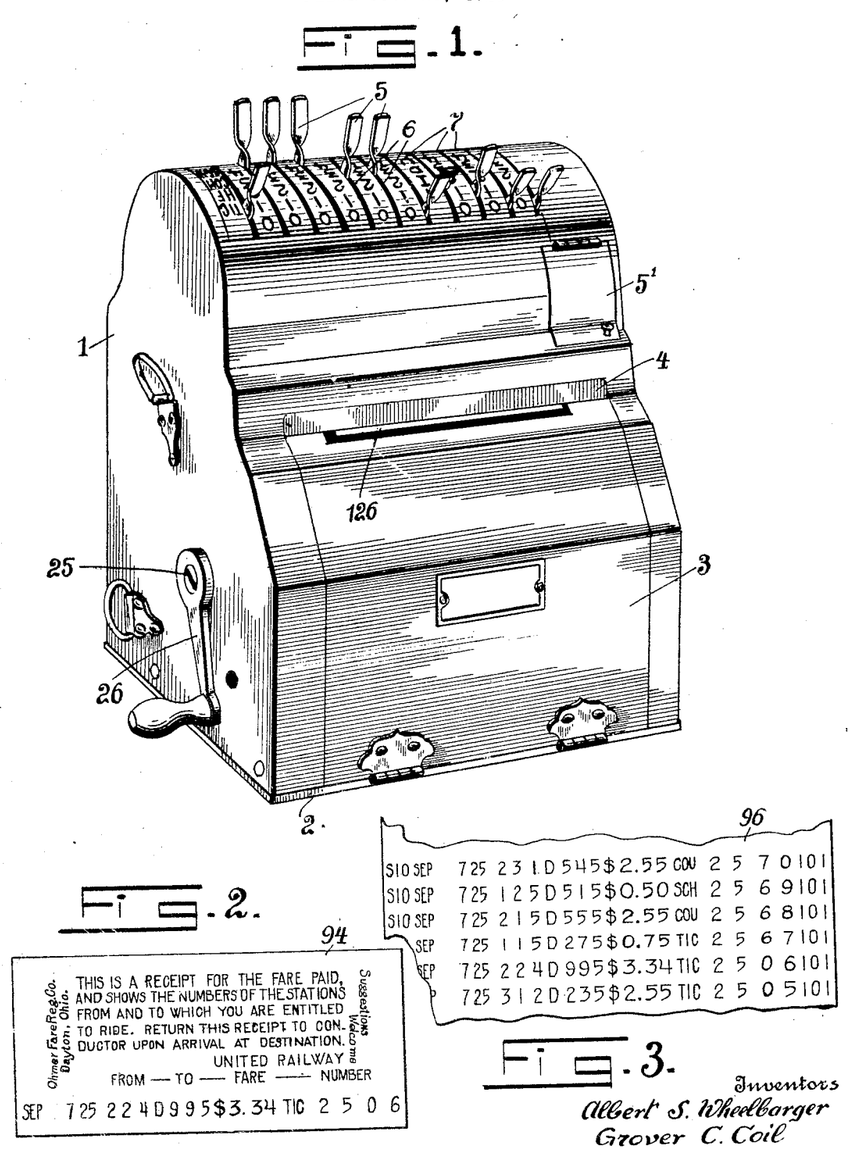
Figure 1 is a perspective view of the front and left sidewall of the machine.
Figure 2 is a view of one of the tickets issued from the machine.
Figure 3 is a representation of a portion of a record as produced by the machine.

Type wheels are provided to print the station where the passenger boarded the car, which type wheels are designated by the reference character 28, the direction of travel 29, the destination designated by the reference character 30, the amount charged for the transportation designated by the reference character 31, and the class of transportation designated by the reference character 32. Each of the type wheels 28 is provided with pinions 33 which mesh respectively with gears 34 rotatably mounted on a shaft 35 supported in the sidewalls of the machine. Each of the gears 34 is secured to one of the levers 5 which slide in the slots 6. The conductor would, therefore, move the three right hand levers (Fig. 1) to the desired position to indicate the number of the station where the passenger boarded the car, which in the instance shown in Fig. 1 is station 001. The type wheels 28 are set so as to print the desired characters, being set through the instrumentality of the levers 5, gears 34, pinions 33 and printing wheels 28. In like manner, each of the printing wheels 30, 31 and 32 are set so as to bring the proper printing character into position.

The date printing wheels 36 are provided with gears 37 actuated by gears 38 operatively connected with thumb wheels 39, which thumb wheels 39 are accessible to the operator when the door 5' is open.

The consecutive counter printing wheels 40 are actuated so as to consecutively number the tickets and the record. The consecutive counter printing wheels 40 are actuated by means of a pitman 41 operatively connecting a wrist pin 42 on the ratchet wheel 8 and an oscillating lever 43 rigidly secured to a shaft 44 mounted in the sidewalls of the machine. The upper end of the lever 43 is provided with a dog 45 normally pulled upward by means of a spring 46 secured to the dog and to the upper end of the lever 43. As viewed in Fig. 8, the dog 45 as it is moved to the left at the end of a printing operation, hereinafter described, engages a ratchet 47 secured to a shaft 48 which shaft also carries rigidly mounted thereon units printer 49 of the consecutive counter 40. Any suitable transfer mechanism may be employed to operate the tens, hundreds and thousands wheels of the consecutive counter.

The date printing wheels 36 (Fig. 5) are held in the position in which they are set by means of the retaining dogs 50 mounted on a shaft 51 which dogs are pressed against the teeth of the gears 38 by means of a spring 51'. The printing characters on the type wheels 36 will thus be held in aligned position after being once set as described above.

*Locking means*

The key 52 is the means by which the operating mechanism of the machine is unlocked, and also furnishes the means for printing the number of the conductor on the record, such as the number "S 10" shown in Fig. 3, the key carrying the printing characters 80 therefor. When the key 52 is inserted within the machine, a cam surface 81 thereon engages the bifurcated end 53 of a lever 54 pivoted at 55 to the sidewall of the machine depressing the upper end of the lever 54 or moving it in a clockwise direction as viewed in Fig. 7, so as to disengage the upper end thereof from the lug 56 carried by a reciprocating bar 57. The upper end of the lever 54 is provided with a cam surface 58 so that when the key is removed the spring 59 will move the lever 54 in an anti-clockwise direction, so that the cam 58 will engage the lug 56 and depress the bar 57. The bar 57 is provided with a slot 60 which receives a pin 61 carried by the sidewall of the machine. The upper end of the bar 57 is provided with a slot 62 which receives a pin 63 carried by an arm 64 rigidly mounted on a sleeve 65 which sleeve is rotatably mounted on a shaft 66. The bar 57 is provided with a pin 67 which extends through a slot 68 in a bar 69, the upper end of which is secured on the pin 63. The pin 63 and the pin 67 are connected by means of a spring 70. The shaft 9 is provided with a disk 71 which has a cutaway portion 72 of a size and shape adapted to receive the lower end of the bar 57.

Figures 4, 5:
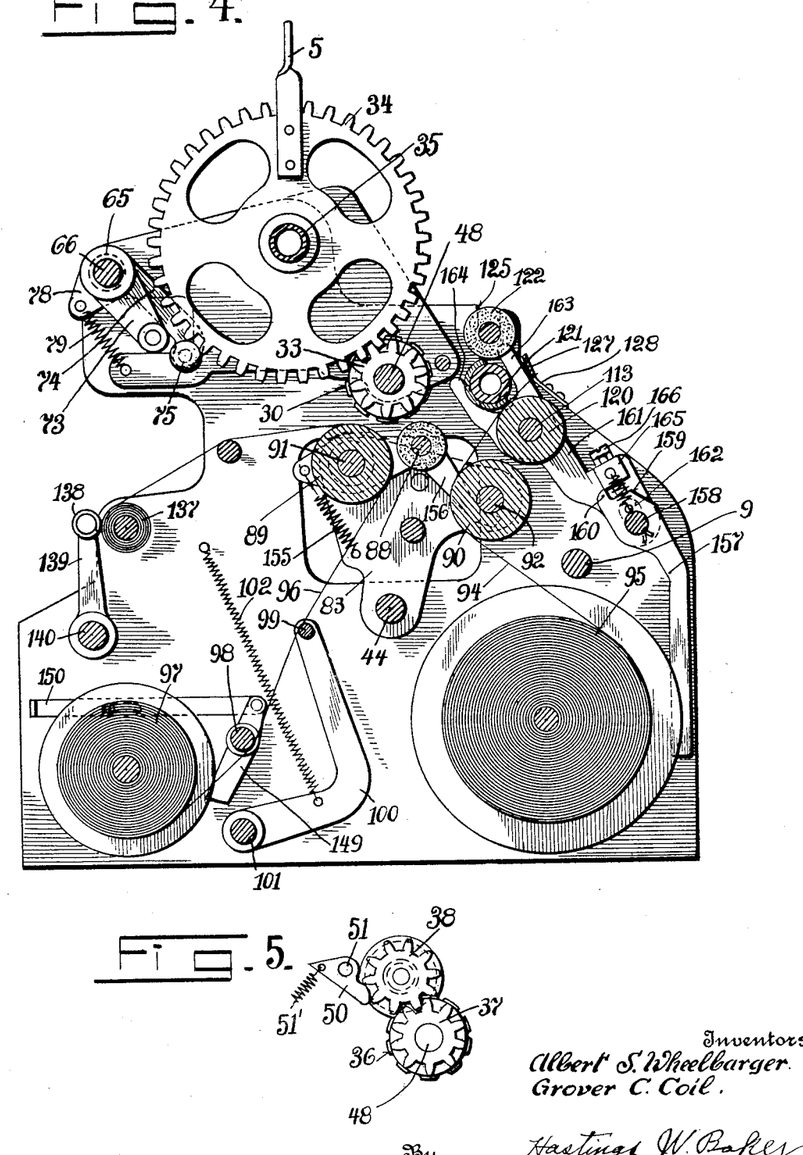
Figure 4 is a cross-sectional view through the machine.
Figure 5 is a detailed view of the date aligning mechanism.

The sleeve 65 is provided with an inwardly depending arm 73 which engages a lever 74 carrying a rod 75. A spring 76 is secured to an arm 77 on the sleeve 65 which spring normally tends to hold the arm 73 against the levers 74. Each of the levers 74 Figure 4 is provided with an extension 78 to which is secured a spring 79 which spring normally tends to hold the rod 75 against the teeth of the gears 34 so as to properly position the characters on the printing wheels.

Figure 7:
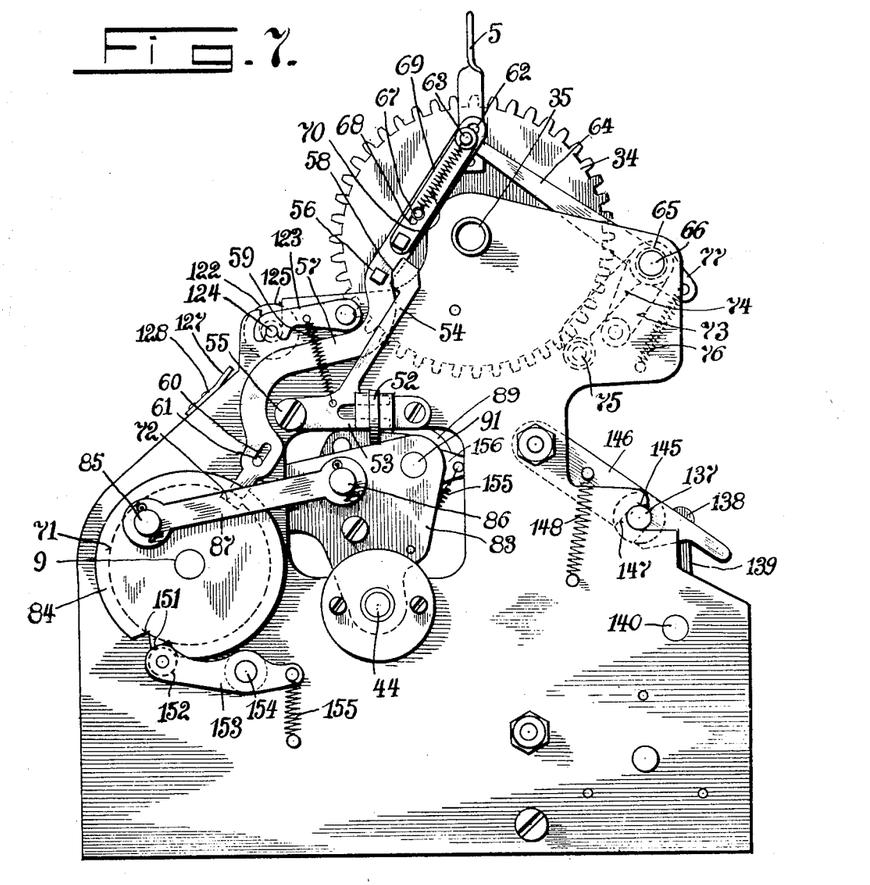
Figure 7 is an elevational view of the right side of the machine.

When the key is inserted the lever 54 is moved downwardly into the position shown in Fig. 7 so that the spring 70 acting on the pin 67 pulls the rod 57 upwardly removing the lower extremity thereof from the cutaway portion 72 so that the machine may now be operated, it being locked when the key is removed by the lower extremity of the rod 57 lying within the cutaway portion 72 so that the main operating shaft 9 cannot be rotated. Furthermore, this mechanism locks all of the levers 5 and gears 34 against any rotation after the crank handle 26 has been even partially rotated, for the reason that when any one of the levers 5 is moved, the gear 34 is moved correspondingly and the teeth of the gear 34 act on the rod 75 moving the lever 74 and the arm 73 in an anti-clockwise direction and rotating the sleeve 65 and the arm 64 in the same direction, but as the pin 63 carried by the arm 64 engages the lowest portion of the slot 62 this movement is impossible, after the cutaway portion 72 of the disk 71 has been rotated out of alignment with the lowermost portion of the bar 57. After the hand lever 26 has, therefore, been moved for even a short distance, the rod 57 cannot be depressed and the rod 75, therefore, holds all of the gears 34 in locked position.

*Operating mechanism for printer*

The pin 82 which operatively connects the pitman 41 and lever 43 is also operatively connected with an oscillating printing carrier 83 which is mounted on the shaft 44. On the other side of the machine, the shaft 9 is provided with a disk 84 carrying a wrist pin 85 which is connected to the oscillating carrier 83 by means of a pin 86 and a pitman 87. The pitmen 41 and 87 move in unison so as to actuate both sides of the printing carrier 83 equally, thereby avoiding the strain that would result if a single pitman were employed.

The oscillating printing carrier 83 is provided with a rotatable ink pad on the shaft 88 carried by levers 156 mounted on the shaft 91. The oscillating printing carrier 83 also carries rotatable platens 89 and 90 on the shafts 91 and 92 respectively. The shaft 88 is resiliently pressed against the printing characters by means of a spring 155 secured to an extension of the lever 156. The lever 156 also extends beneath the shaft 92 which shaft acts as a stop to limit the upward pull on the lever 156 by the spring 155. As is clearly apparent from Figures 4 and 8, when the crank handle 26 is rotated clockwise the ratchet wheel 8 and wrist pin 42 are moved anti-clockwise during the first 90° rotation, approximately, of the crank handle 26. The oscillating carrier 83 is moved anti-clockwise so as to bring the ink pad 88 from the position shown in Fig. 4 to a position approximately beneath the type wheels 30. The ink roller 88 now inks all of the printing wheels 28, 29, 30, 31, 32, 36 and 40 as well as the type 80 on the inner end of the key 52 and the type 93, showing the number of the machine, which type 93 are secured to the frame of the machine. The type 93 is the means for printing the number "101" on the record shown in Fig. 3.

As the crank handle 26 continues its rotation, between the first 90° of its movement and the first 180° thereof, the platen 90 is brought beneath the type wheels. The ticket strip 94 is thereby pulled from the ticket supply roll 95 and has impressed thereon, by means of the printing wheels, the characters shown in the last line of Figure 2.

As the crank handle 26 continues its rotation from its 270° position to its 540° position, the patmen pull the oscillating carrier 83 to the right as viewed in Fig. 4, or in a clockwise direction so that the ink pad 88 is again brought into contact with the characters on the printing wheels and the platen 89 is brought beneath the printing characters. The platen 89 carries the record strip 96 which is unwound from a record roll 97 and which passes under a shaft 98 and over a rod 99 which rod is carried between two arms 100 mounted on a shaft 101. The rod 99 is normally pulled upward by means of a spring 102 so as to keep the paper taut. As the platen 89 is brought beneath the printing wheels an impression is made on the record strip (shown in Fig. 3) and the record strip is later advanced for the next impression by means to be hereinafter described.

The last line on the ticket and the record have now been printed and as the crank handle 26 moves from its 540° position to its 720° position the oscillating printing carrier 83 is moved counter clockwise and the dog 45 engages the ratchet 47 rotating the shaft 48 for the distance of a tooth, which moves the unit wheel 49 of the consecutive counter 40 to the next number thereon.

Signal operating means

A lever 103 is pivoted on a pin 104 projecting from a sidewall of the machine which lever 103 is provided with cam tooth 105 which is actuated by the teeth of the ratchet 47. A bell 106 is secured to one of the sidewalls of the machine and is sounded by means of a clapper 107 carried by the lever 103. As the ratchet wheel 47 is actuated by the dog 45, the tooth of the ratchet immediately beneath the cam tooth 105 of the lever 103 is raised which raises the lever 103 and moves the clapper 107 from the inner surface of the bell 106. As soon as the tooth on the ratchet passes the cam tooth 105 on the lever 103, a spring 108 pulls the lever 103 downwardly so that the clapper 107 strikes the bell 106 and gives an audible signal.

Ticket issuing means

The shaft 9 has rigidly mounted thereon a disk 109 and a segmental gear 110 which gear 110 is also provided with a disk surface 111 which extends for approximately 270°. A pinion 112 is rigidly secured to a shaft 113 which pinion 112 is approximately the combined width of the disk 109 and gear 110 except that one of its teeth, 114, is only one-half the width of the other teeth, which tooth 114 lies in the plane with the teeth on the segmental gear 110. The disk 109 is provided with an arcuate cutaway portion 115 extending between the teeth 116 and 117 of the gear 110. The pinion 112 meshes with a pinion 118 mounted on a shaft 119. The shaft 113 carries a platen 120 and the shaft 119 carries an electrotype 121 having thereon type adapted to print all of the ticket shown in Fig. 2, with the exception of the last line thereon. The electrotype 121 engages an ink pad 122 which is pulled downwardly against the electrotype 121 by means of levers 123, spring tensioned against the shaft 124 on which the ink roller 122 is mounted. The shaft 124 is mounted within a slot 125 in the sidewalls of the casing.

As the handle 26 is rotated, the disk 109 and gear 110 rotate in an anti-clockwise direction, but at first the pinion 112 is not actuated and will not be until the crank handle has made almost a complete revolution, or until tooth 116 of the gear 110 engages the half-tooth 114 of the pinion 112 thereby partially rotating the pinion 112 so that its remaining teeth engage the teeth of the segmental gear 110. The pinions 112 and 118 are now rotated. After the crank handle 26 has been moved just beyond its 540° position, when the tooth 114 passes beyond the tooth 117 of the segmental gear 110, and the two adjoining teeth of the pinion 112 engage the periphery of the disk 109, the pinion 112 is locked against further operation. As the pinions 112 and 118 rotated, the ticket strip 94 was fed between the platen 120 and electrotype 121 printing on the ticket all of the printed matter thereon except the last line which last line had been previously impressed thereon by the platen 90 engaging the type wheels. The electrotype 121 is inked by means of the rotatable ink pad 122. The ticket is issued through a slot 126 immediately below a serrated knife blade 127 carried by brackets 128 secured to the side walls of the machine. The ticket is now in a position to be grasped by the passenger and removed from the machine.

*Feeding means for the record strip*

Means are provided whereby the record strip is fed forward equal spaces between successive printing operations regardless of the thickness of the roll on which the record strip is wound. The pin 82 engages a pusher 127' pivoted on the shaft 35, which pusher engages an oscillating lever 128' pivoted on a shaft 129. The lever 128' is provided with a pivoted link 130 which carries a double nosed pawl 131 pivoted thereto on a pin 132. The double nosed pawl 131 therefore moves with the lever 128' and engages a ratchet 133 rigidly mounted on the shaft 129. A double nosed pawl 134 is provided beneath the ratchet 133 to prevent retrograde movement of the ratchet 133, which pawl is carried by a link 135 and is pressed against the ratchet by means of a spring 136. The take-up roll 137 for the record is engaged by a roller 138 on an arm 139 fixed on a shaft 140 which shaft 140 also has fixedly secured thereto an arm 141. It is obvious that as the thickness of the take-up roll increases, the arm 139 will be moved in an anti-clockwise direction as viewed in Fig. 4 which will move the arm 141 in a like direction so that the upper end of the arm 141 will be moved nearer and nearer to the rear of the machine as the thickness of the take-up roll increases. The upper end of the arm 141 is provided with an up-standing lip 142 which engages a pin 143 on the lever 128'. A spring 144 is attached to the pin 143 and to a sidewall of the machine so as to normally pull the lever 128' and arm 141 towards the front of the machine thereby keeping the roller 138 in direct contact with the take-up roll 137. As the lip 142 on the arm 141 is moved towards the rear of the machine, as the thickness of the take-up roll increases, the forward movement of the lever 128' is thereby varied so that the dog 131 will slide over fewer and fewer teeth, which will afford more and more play between the pusher 127' and the lever 128' thereby insuring equal spacing between successive impressions on the record.

The take-up roll 137 is mounted in a slot 145 in the machine and is held in position by means of a lever 146 provided with a slot 147, which lever is pulled downwardly by means of a spring 148. The take-up roll may be readily removed by raising the lever 146 against the tension of the spring 148 so that the take-up roll can be readily grasped by the hand of the operator and be removed.

Since the rod 99 (Fig. 4) is tensioned by means of the spring 102 and is held in position by the tension of the record paper, it is obvious that when the record paper was removed to insert a new record the rod 99 would move to such a position as to render it difficult to thread the paper under the shaft 98, over the rod 99 and under the platen 89. In order to obviate this difficulty, we have mounted a lever 149 on the shaft 98 which lever is actuated by means of a push and pull rod 150 secured to a sidewall of the machine by means of a pin and slot connection. When the paper is to be removed the rod 150 is pulled towards the rear of the machine which projects the lower end of the lever 149 against the upper surface of the arm 100 holding it in the approximate position shown in Fig. 4. The outer end of the rod 150 now projects beyond the back wall of the machine so that it would be impossible to insert the casing over the frame-work of the machine without the record roll being in position. As soon as the record roll has been inserted the rod 150 is pushed inwardly so as to move the lower end of the lever 149 from interference with the movement of the arm 100 and so that the casing could be inserted over the machine.

We have heretofore explained that the dog 11 serves as a means to prevent an actuation of the machine unintentionally as well as insuring that the ticket is completely issued before the machine is operated to print and issue another ticket. As an additional means to prevent the crank handle 26 being unintentionally operated in an anti-clockwise direction so as to unlock the full stroke mechanism, we have provided two notches 151 in the disk 84 which notches are engaged by a roller 152 carried by a lever 153 pivoted on a pin 154, which lever is spring tensioned by means of a spring 155, so as to press the roller 152 towards the shaft 9 so that it would lie in one of the notches 151 or on the periphery of the disk 84. As soon as the printing operation is completed the roller 152 will lie in the left notch 151 as viewed in Fig. 7. In order therefore to rotate the crank handle 26 in a counter-clockwise direction so as to unlock the full stroke mechanism, it is necessary to exert sufficient force on the crank handle 26 so as to rotate the shaft 9 and disk 84 against the tension of the spring 155 or so that the roller 152 will ride over the tooth separating the two notches 151. After the full stroke mechanism has been unlocked the disk 84 may be rotated in a clockwise direction with the roller 152 riding on the periphery of the disk 84.

Means are also provided whereby the platen 120 may be separated from the electrotype 121. This means is clearly shown in Fig. 4. A lever 157 is pivoted on each sidewall of the machine, which lever is pivoted on a rod 158 and is provided at its upper end with a cam surface 159 and a stop lug 160. A bar 161 is provided with a slot 162 which slot receives the rod 158. The bar 161 carries the platen shaft 113 and is provided at its upper end with arms 163 and 164 which straddle the ends of the electrotype, the electrotype serving as a guide for the upper end of bar 161. The bar 161 also carries a lug 165 which receives a screw 166. The screw 166 may be adjusted so that the lower end projecting below the lug 165 may be made to engage the cam surface 159 at any desired point so as to vary the extent of movement of the bar 161. When the ticket strip is being inserted the lever 157 will be pulled forward so that the cam surface 159 will be beyond the lower end of the screw 156 which permits the bar 161 to be lowered to separate the platen from the electrotype so that the paper may be readily inserted between the same. After the ticket strip or paper has thus been inserted, the lever 157 is pushed rearwardly into the position shown in Fig. 4 the cam surface 159 engaging the lower end of the screw 156 which elevates the platen 120 against the electrotype.

It is obvious that many changes may be made in the construction of the various parts shown and described in this application without departing from the spirit of the claims. We, therefore, expressly reserve the right to make all changes in construction or operation of the machine which would fall within the scope of the appended claims. Having described the invention in its preferred embodiment, we claim:

1. In a machine of the class described, a driving gear, a gear driven thereby, an oscillating printing frame actuated by the driven gear, and means operated by the printing frame whereby a record is printed as said frame moves in one direction and a part of a ticket is printed as said frame moves in the opposite direction.

2. In a machine of the class described, a type carrier, means whereby the type are inked, and oscillating means whereby an impression on a ticket is taken from said type and the type then reinked, and whereby an impression on a record is subsequently taken from the type.

3. In a machine of the class described, a bank of wheels provided with printing characters, and oscillated means whereby said characters are inked twice, and whereby impressions are taken from said type on both a ticket and a record.

4. In a machine of the class described, a bank of wheels provided with printing characters which are stationary during the printing operation, and oscillated means whereby said characters are inked twice, and whereby impressions are taken from said type on both a ticket and a record.

5. In a machine of the class described, a bank of wheels provided with printing characters, an oscillatable printing carrier, an ink roller and a plurality of platens carried by the carrier, said ink roller being moved into contact with said printing characters twice during a complete cycle of movement of the carrier, each of said platens being successively pressed against said characters after they have been inked.

6. In a machine of the class described, a bank of wheels provided with printing characters, a carrier, an ink roller and a plurality of platens carried by said carrier, and means whereby said carrier is oscillated so as to bring successively said ink roller, one of said platens, said ink roller and the other of said platens adjacent to said printing characters.

7. In a machine of the class described, a bank of wheels provided with printing characters, means whereby said wheels may be rotated so as to bring any combination of said characters into printing position, a carrier, an ink roller and a plurality of platens carried by said carrier, and means whereby said carrier is oscillated so as to bring successively said ink roller, one of said platens, said ink roller and the other of said platens into printing contact with said printing characters.

8. In a machine of the class described, a bank of wheels provided with printing characters which are stationary during the printing operation, means whereby any one of said wheels may be operated to bring any one of the printing characters thereon into printing position, a pivoted carrier, an ink roller and a plurality of platens carried by said carrier, and means whereby said carrier is oscillated so as to bring successively said ink roller, one of said platens, said ink roller and the other of said platens directly beneath the printing characters on said wheels.

9. In a machine of the class described, a bank of wheels provided with printing characters, a carrier, an ink roller and a plurality of platens mounted on said carrier, and means whereby said carrier is oscillated so as to bring successively said ink roller and one of said platens into printing contact with said characters to print a part of a ticket, said means then bringing said ink roller and the other of said platens into printing contact with said printing characters to print a record.

10. In a ticket printing and recording machine, a bank of printing characters, a printing carrier, means whereby said carrier is oscillated, and means actuated by the movement of said carrier to print from the printing characters a ticket while said carrier moves in one direction and a record while said carrier moves in the opposite direction.

11. In a ticket printing and recording machine, a bank of printing characters, a printing carrier, means whereby said carrier is oscillated, means actuated by the movement of said carrier to print from the printing characters a ticket while said carrier moves in one direction and a record while said carrier moves in the opposite direction, and means to advance the ticket after it has received its impression from the characters.

12. In a machine of the class described, a bank of wheels provided with printing characters, an oscillating printing means, means whereby the machine is operated, and means whereby a part of a ticket is printed as said first mentioned means moves in one direction and a record is printed from the characters as said first mentioned means moves in the opposite direction.

13. In a machine of the class described, printing type carried thereby, an oscillating printing means, means whereby the machine is operated and means whereby a part of a ticket is printed as said first mentioned means moves in one direction and a record is printed by the type as said first mentioned means moves in the opposite direction.

14. In a machine of the class described, printing type carried thereby, and means whereby a part of a ticket and a detailed record are printed from the type each time the machine is operated, and means whereby the type are inked before and after the impression is made on the ticket.

15. In a machine of the class described, a bank of printing characters, a carrier, a plurality of platens and an inking device carried by said carrier and adapted to be successively engaged by said bank of printing characters, and means whereby said carrier is oscillated to print a record and a part of a ticket.

16. In a machine of the class described, a bank of printing characters, an oscillating carrier, a plurality of platens and an inking device carried by said oscillating carrier and adapted to be successively engaged by said bank of printing characters, and means whereby said carrier is actuated to print a record and a part of a ticket.

17. In a machine of the class described, a bank of printing characters, a carrier, a plurality of rotatable platens and an inking device carried by said carrier and adapted to be successively engaged by said bank of printing characters, and means whereby said carrier is oscillated to print a record and a part of a ticket.

18. In a machine of the class described, a bank of printing characters, an oscillating carrier, a plurality of freely rotatable platens and an inking device carried by said carrier and adapted to be successively engaged by said bank of printing characters, and means whereby said carrier is oscillated to print a record and a part of a ticket.

19. In a machine of the class described, a bank of printing characters, a pivoted carrier, means whereby said carrier may be oscillated, a plurality of rotatable platens and an inking device carried by said carrier and adapted to be successively engaged by said bank of printing characters, and means whereby said carrier is actuated to print a record and a part of a ticket.

20. In a machine of the class described, a bank of printing characters, a carrier, a plurality of platens on said carrier, and means whereby said platens are successively brought into contact with said characters by one complete oscillation of said carrier.

21. In a machine of the class described, a bank of printing characters, an oscillating carrier, a plurality of platens on said carrier, and means whereby said platens are successively brought into contact with said characters.

22. In a machine of the class described, a bank of printing characters, means whereby said characters are held in a fixed position during the printing operation, a carrier, a plurality of platens on said carrier, and means whereby said platens are successively brought into contact with said characters by one complete oscillation of said carrier.

23. In a machine of the class described, a bank of printing characters, means whereby said characters are held in a fixed position during a printing operation, a carrier, a plurality of platens on said carrier, and means whereby said platens are successively brought into contact with said characters by one complete oscillation of said carrier.

24. In a machine of the class described, a bank of printing characters, a carrier, a plurality of platens on said carrier, means whereby said platens are successively brought into contact with said characters by one complete oscillation of said carrier, and means whereby the characters are inked.

25. In a machine of the class described, a bank of printing characters, an oscillating carrier, a plurality of platens on said carrier, means whereby said platens are successively brought into contact with said characters, and means to ink the characters.

26. In a machine of the class described, a bank of printing characters, means whereby said characters are held in a fixed position during the printing operation, a carrier, a plurality of platens on said carrier, means whereby said carrier is oscillated so that said platens are successively brought into contact with said characters, and means to ink the same.

27. In a machine of the class described, a bank of printing characters, a carrier, a plurality of platens on said carrier, means whereby said carrier is oscillated so that said platens are successively brought into contact with said characters, and inking means movable with said carrier and adapted to ink said characters.

28. In a machine of the class described, a bank of printing characters, a carrier, a plurality of platens on said carrier, means whereby said carrier is oscillated so that said platens are successively brought into contact with said characters, and rotatable inking means movable with said carrier and adapted to ink said characters.

29. In a machine of the class described, a bank of printing characters, a carrier, a plurality of platens on said carrier, means whereby said carrier is oscillated so that said platens are successively brought into contact with said characters, an inking means movable with said carrier, and means whereby said inking means is resiliently pressed against said characters so as to roll across the same to ink the characters.

30. In a machine of the class described, a bank of printing characters, a pivoted carrier, a platen, an inking means movable with said carrier and adapted to be successively brought into printing contact with said characters, a rotatable means whereby said carrier is oscillated, and means whereby said rotatable means is locked against accidental operation.

31. In a machine of the class described, a bank of printing characters, a pivoted carrier, a platen, an inking means movable with said carrier and adapted to be successively brought into printing contact with said characters, a consecutive printing counter, and a common means whereby said consecutive counter and said carrier are actuated.

32. In a machine of the class described, a bank of printing characters including a consecutive counter, an audible signal and an oscillating platen carrier coacting with said characters to print, means whereby said carrier is actuated, means whereby said consecutive counter is actuated simultaneously with the movement of the carrier, and means whereby said signal is sounded.

33. In a machine of the class described, a bank of printing characters including a consecutive counter, an audible signal and an oscillating platen carrier coacting with said characters to print, and means whereby said counter is actuated and said signal is sounded as the carrier completes its movement.

34. In a machine of the class described, printing type, a printing frame coacting therewith and means whereby said printing frame is oscillated into a plurality of printing positions with regard to said type.

35. In a machine of the type described, printing characters, a carrier, a plurality of platens thereon and means whereby said carrier is oscillated so as to bring successively said platens into printing engagement with said characters.

36. In a machine of the type described, printing characters, a carrier, a plurality of platens thereon, means whereby said carrier is oscillated so as to bring successively said platens into printing engagement with said characters and means whereby said characters are inked before each printing engagement.

37. In a machine of the type described, a carrier, a pivot therefor, a plurality of platens carried thereby, the outer parts of said platens lying on a circle concentric with said pivot and means whereby said carrier is oscillated.

38. In a machine of the type described, printing characters, a carrier, a plurality of platens thereon, an ink roller between said platens and carried by said carrier and means whereby said carrier is oscillated so as to bring successively said ink roller, one of said platens, said ink roller and the other of said platens into engagement with said characters.

39. In a machine of the type described, a carrier, a pivot therefor, a plurality of platens carried thereby, a part of the periphery of said platens lying on a circle concentric with said pivot, an ink roller carried by said carrier and having a part of its periphery normally beyond the circle concentric with said pivot and passing through a part of the periphery of said platens.

40. In a machine of the type described, printing characters, a carrier, a plurality of platens thereon, a single ink roller for both of said platens and adapted to engage and ink said characters and means whereby said carrier is oscillated so as to bring successively said platens into printing engagement with said characters.

41. In a machine of the type described, printing characters, a carrier, a plurality of platens thereon, a resiliently mounted ink roller carried by said carrier and means whereby said carrier is oscillated so as to bring said platens and ink roller into engagement with said characters.

42. In a machine of the type described, printing characters, a carrier, a plurality of shafts thereon, a platen mounted on each of said shafts, a spring-pressed lever pivoted on one of said shafts and normally engaging the other of said shafts, a shaft carried by said lever, an ink roller mounted on said last mentioned shaft and means whereby said carrier is actuated so as to bring said platens and ink roller into engagement with said characters.

43. In a machine of the type described, a plurality of printing wheels, a plurality of platens and means to oscillate each of said platens into engagement with said wheels.

44. In a machine of the type described, type, a plurality of platens carrying ticket and record paper, means whereby said platens are oscillated to bring said ticket paper into contact with said type as said platens move in one direction to print a ticket and subsequently to bring the paper from the other of said platens into contact with said type while said platens move in the opposite direction to print a record.

45. In a machine of the type described, type, a plurality of platens carrying ticket and record paper, means whereby said platens are oscillated to bring said ticket paper into contact with said type as said platens move in one direction to print a ticket and subsequently to bring the paper from the other of said platens into contact with said type while said platens move in the opposite direction and means to advance said paper.

46. In a machine of the type described, type, a carrier, a plurality of platens on said carrier, and actuating means for said carrier whereby one of said platens is brought into engagement with said type while said carrier moves in one direction and the other of said platens is brought into printing engagement with said type when said carrier is moved in the opposite direction.

47. In a machine of the type described, type, a carrier, a plurality of platens on said carrier, actuating means for said carrier whereby one of said platens is brought into engagement with said type while said carrier moves in one direction and the other of said platens is brought into printing engagement with said type when said carrier is moved in the opposite direction and a single inking means to ink said type before either of said platens is brought into printing engagement with said type.

48. In a machine, type, a carrier, a plurality of platens and an inking means carried by said carrier, and means whereby said carrier is actuated so that said inking means inks said type and thereafter one of said platens is moved into engagement with said type and said inking means is again moved into contact with said type and the other of said platens is then brought into engagement with said type.

49. In a machine of the class described, type, means whereby the type are inked, means whereby an impression on a ticket is taken from said type and the type then re-inked, and means whereby an impression on a record is subsequently taken from the type.

50. In a machine of the class described, a bank of wheels provided with printing characters, means whereby said wheels are held stationary during a printing operation, means whereby said characters are inked twice, and means whereby impressions are taken from said type on both a ticket and a record.

51. In a machine of the class described, a bank of wheels provided with printing characters which are stationary during the printing operation, means whereby said characters are inked twice and means whereby impressions are taken from said type on both a ticket and a record.

52. In a machine of the class described, a bank of wheels provided with printing characters, an oscillatable printing carrier, an ink roller and a plurality of platens carried by the carrier, said ink roller being moved into contact with said printing characters twice during a complete cycle of movement of the carrier, each of said platens being successively pressed against said characters after they have been inked.

53. In a machine of the class described, a bank of wheels provided with printing characters, a carrier, an ink roller and a plurality of platens carried by said carrier, and means whereby said carrier is moved so as to bring successively said ink roller, one of said platens, said ink roller and the other of said platens adjacent to said printing characters.

54. In a machine of the class described, a bank of wheels provided with printing characters, means whereby said wheels may be rotated so as to bring any of said characters into printing position, a carrier, an ink roller and a plurality of platens carried by said carrier, and means whereby said carrier is moved so as to bring successively said ink roller, one of said platens, said ink roller and the other of said platens into printing contact with said printing characters.

55. In a machine of the class described, a bank of wheels provided with printing characters which are stationary during the printing operation, means whereby any one of said wheels may be operated to bring any one of the printing characters thereon into printing position, a pivoted carrier, an ink roller and a plurality of platens carried by said carrier, and means whereby said carrier is moved so as to bring successively said ink roller, one of said platens, said ink roller and the other of said platens directly beneath the printing characters on said wheels.

56. In a machine of the class described, a bank of wheels provided with printing characters, a carrier, an ink roller and a plurality of platens mounted on said carrier, and means whereby said carrier is moved so as to bring successively said ink roller and one of said platens into printing contact with said characters to print a ticket, said means then bringing said ink roller and the other of said platens into printing contact with said printing characters to print a record.

57. In a machine of the class described, a bank of printing wheels, means to hold said wheels stationary during a printing operation, means whereby any one of said printing wheels may be moved to bring other type into position, a plurality of rolls of paper, means whereby the paper from one of said rolls is brought into contact with said wheels to print a ticket and subsequently to bring the paper from the other of the said rolls into contact with said wheels to print a record, and means to hold said paper under tension while it is being printed.

58. In a machine of the class described, a bank of printing wheels, a plurality of rolls of paper, means whereby the paper from one of said rolls is brought into contact with said wheels to print a ticket and subsequently to bring the paper from the other of said rolls into contact with said wheels to print a record, means to hold said paper under tension while it is being printed, and means to advance said paper before the next impression is made thereon.

59. In a ticket printing and recording machine, a bank of printing characters, a printing carrier, means whereby said carrier is oscillated, and means actuated by the movement of said carrier to print successively a ticket and a record from the printing characters.

60. In a ticket printing and recording machine, a bank of relatively movable printing characters, a printing carrier, means whereby said carrier is oscillated, means actuated by the movement of said carrier to print a ticket and a record from the printing characters, and means to advance the ticket after it has received its impression from the characters.

61. In a ticket printing and recording machine, a bank of relatively movable printing characters, a printing carrier, means whereby said carrier is oscillated, means actuated by the movement of said carrier to print a ticket and a record from the printing characters, and means to advance the record before it has received an impression from the printing character.

62. In a ticket printing and recording machine, a bank of relatively movable printing characters, a printing carrier, means whereby said carrier is oscillated, means actuated by the movement of said carrier to print a ticket and a record from the printing characters, and means to advance both the ticket and the record.

63. In a machine of the class described, a set of printing type, actuating means for the said machine, means operated by the said actuating means whereby a part of a ticket and a record are printed by the said type, means actuated by the said actuating means whereby the ticket is advanced, means adapted to facilitate the severance of the ticket, and means whereby the total number of passengers carried to date and the amount paid by said passengers may be indicated.

In testimony whereof we affix our signatures.

ALBERT S. WHEELBARGER.
GROVER C. COIL.